May 12, 1953
N. C. WILLIAMS ET AL
2,638,108
PUSH-PULL CONTROL VALVE
Filed June 24, 1949
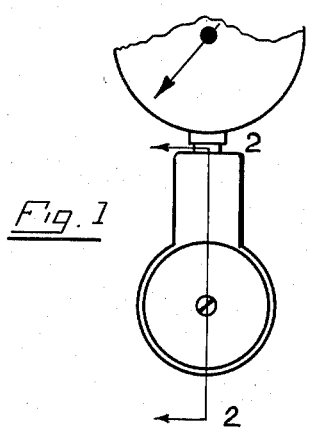
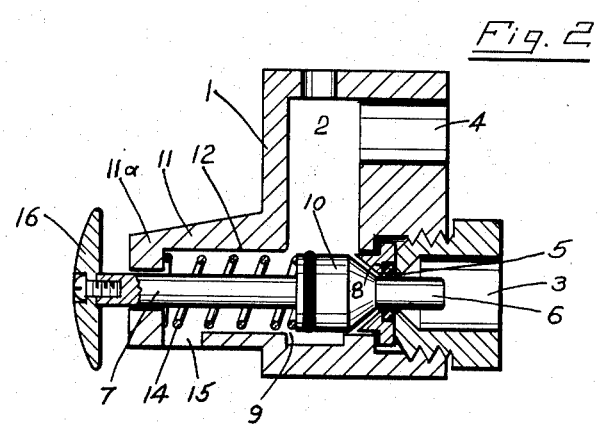
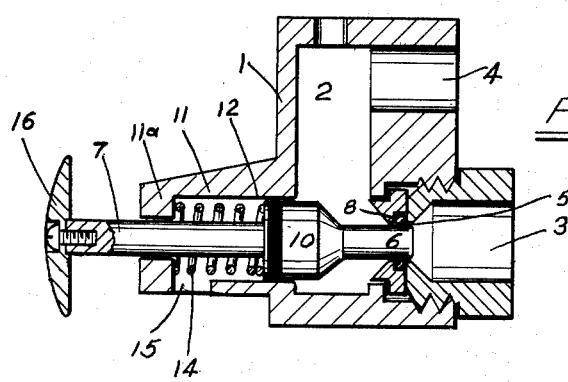
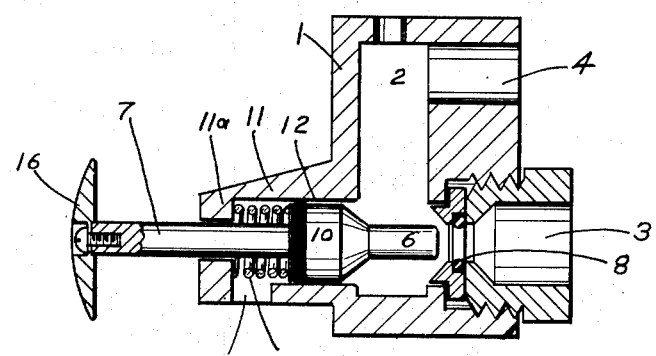
INVENTOR.
NORMAN C. WILLIAMS
ROLLIN W. FISHWOOD
BY
G. F. McDougall
ATTORNEY

Patented May 12, 1953

2,638,108

UNITED STATES PATENT OFFICE 2,638,108

PUSH-PULL CONTROL VALVE

Norman C. Williams and Rollin W. Fishwood, Portland, Oreg., assignors to Power Brake Equipment Co., Portland, Oreg.

Application June 24, 1949, Serial No. 101,026

6 Claims. (Cl. 137—102)

This invention relates to a single plunger, push or pull button valve without valve-seats, latches or outside controls other than a manual operating button, or its equivalent.

An object of the invention is a valve equipped with an operating valve stem that will normally remain in any one of three different positions to accomplish as many functions, without external control other than the button on the end of the single valve stem, for which many things may be substituted.

It is an object to supply a valve that will remain open to supply full pressure connection between a pressure supply and a pressure using device, after initial operation has establish an above minimum pressure in such a device, but which will instantly and automatically close and move to exhaust in case of accidental or intentional reduction of the pressure below such minimum, the valve being concurrently capable of maintaining a less than maximum pressure within the device, without going to exhaust, if such lower pressure is desirable, as is often required in air brake operation.

It is still another object to furnish such a valve with a single stem having two valve members thereon, that are so formed and positioned that the smaller of the two valves controls an air supply and the larger controls exhaust and wherein the air supply valve must necessarily close before the exhaust opens.

An important object is simplicity of construction, with a total absence of small weak parts that are likely to get out of order and carries with its simplicity a relatively low manufacturing cost and a ruggedness of construction that means a long trouble free operating life.

The valve is especially valuable in air brake controls and those familiar with engineering air brakes for trucks and the like will at once see other objects and novel structural and operational features that are superior to the valves now available as a single operational unit, apparent from the following description and pointed out in the claims.

Drawings accompany and form a part of the disclosure herein, in which,

Fig. 1 is a plan view of the valve, pressure gauge attached, looking towards the push or pull button;

Fig. 2 is a section taken on the line 2—2, Fig. 1, except that the pressure gauge is not sectioned; showing the valve in the normal closed position;

Fig. 3 is the same structure, valve only, shown in Fig. 2, but the single stem is in the pressure maintaining position with respect to an operated device, as will be explained; and Fig. 4 represents the same structure as Figs. 2 and 3 with the valve stem moved to establish full connection between an operable pressure using device.

Describing the figures and their several parts in greater detail: Numeral 1 represents a hollow body containing an inner passageway 2, which forms a communication between a pressure supply connection port 3, and an operating connection port 4, to a device sensitive to and operable by fluid pressure.

A valve cylinder 5 comprises a seatless restricted cylinder between the passageway 2 and supply port 3. This valve cylinder 5 is controllable by a plunger type valve 6, that keeps the valve cylinder 5 closed through a considerable range of motion of the plunger type valve 6 that is a part of the valve stem 7. Suitable ring packing 8 will make a tight closure whenever the straight cylindrical part of the valve 6 is within the ring packing 8.

Integral with the valve stem 7 is a cylindrical plunger type valve 10, of such size that its section shown, will be several times the area of the first named plunger valve 16, and so spaced on the valve stem 7, that the valve cylinder 9, controlled by said larger valve 10, will always be closed off by the valve 10, sealing off the cylinder 12, bored in the extension 11, of the hollow body 1, if the valve 10 is within the cylinder.

The extension 11 is terminated by an integral cap portion 11a, and the top of the cylinder 12 serves as a base for the compression spring 14. An exhaust port 15 is formed adjacent the cap 11a as shown, the opposite end of the spring 14, bearing against the second or larger plunger valve 10; the spring being of such strength that it will require an internal pressure of a suitable predetermined amount in the passageway 2, to maintain valve 6 open against the spring 14. A button 16 is fixed to the outer end of the valve stem 7, and when pressure fluid is required to flow from port 3 to and through port 4, the button 16 is pulled, lifting the stem 7 to the position shown in Fig. 4 and flow is established. It may be that a reservoir is to be filled with compressed air, such as the auxiliary reservoir on a trailer part of a truck trailer combination and it may be that equalization of pressure between a source of pressure and the reservior is desired; in which case the stem 7 will remain as shown in Fig. 4, by being held open until the predetermined pressure is reached.

It will be observed that the effective area of the valve 10 has been diminished by the amount of the area of the plunger valve 6 and, also, the spring 14, being partly extended, will have less effective force. It is intended that when pressure falls quite low in the passageway 2, the valve 10 will go to exhaust, by the complete withdrawal of the valve 10 from the cylinder 12, automatically. Of course, a pressure of moderate amount on the button 16 will produce this result immediately, when wanted.

This illustrates the three positions mentioned supra and illustrates a beneficial control sequence. Others will be at once apparent to those skilled in the brake and related air control arts.

Having fully disclosed our novel control valve, illustrated an excellent form in which it can be constructed, and described a characteristic beneficial operation of the invention, what we claim as new and desire to secure by Letters Patent, is:

1. A manual control valve for apparatus workable by fluid under pressure comprising a body provided with inlet and outlet ports, a pressure passage between said ports, a single operating valve stem within and without said body, a large and a small valve of the plunger type in spaced position on the valve stem, supply and exhaust valve cylinders within which said valves are fitted to enter to close the valve cylinders and leave to open the same, to coordinately operate said ports, a compression spring backing for said large valve tending to normally close said inlet port leaving said outlet port open, except when opposed by accumulated pressure under said large valve and a manual handle on said valve stem external of said body.

2. A manual control push and pull valve comprising a body, an operating control passage therein, inlet and outlet ports on opposite sides of said body and said control passage, a large and a small valve cylinder forming a part of said ports, a valve stem movably positioned in said cylinders, a large valve mounted to control said outlet port, a coaxial small valve mounted on said stem to control said inlet port, said valves fitted to said cylinders to control said ports by entering and leaving said cylinders and being so spaced apart on said stem that both ports can be concurrently closed but not concurrently opened and the said valve stem spring biased to hold the outlet open and the inlet closed.

3. A manual push and pull control valve, comprising a body, an operating control passage therein, said body provided with aligned inlet and exhaust ports, a manually reciprocable valve stem cooperatively mounted to control said ports by valves made integral therewith, a large outlet valve on said valve stem, a valve cylinder formed in said body, said outlet valve sealingly movable into and out of said cylinder to close or open said outlet port, a small valve formed on said valve stem, a small cylinder into which said small valve is sealingly movable to close said inlet port, said valves on said stem spaced apart and the cylinders of such operating length with respect to the spacing apart of the valves, that the inlet cannot be opened until the outlet is closed.

4. A control valve for pressure fluids, comprising a body, pressure supply, pressure transmitting and exhaust ports formed in said body, passages connecting said ports with large and small spaced valve cylinders aligned and coaxial with said supply port, a valve stem coaxial with and movable within said valve cylinders, a large and a small valve of the plunger type mounted on said valve stem, fitted to move into and out of said valve cylinders to open and close the same, manual means for selectively moving said valves concurrently, a spring backing for said large valve biasing it to hold said smaller valve and said valve stem to close said pressure supply and open said exhaust port save when pressure beneath the large valve is sufficient to overcome the bias of said spring backing.

5. A control valve for fluid pressure operated devices comprising a body, an internal fluid pressure passageway in said body, pressure supply and outlet ports in communication with opposite sides of said passageway, a spaced pair of aligned valve cylinders forming a part of each port, comprising a large cylinder for the outlet port and a smaller cylinder for the inlet port, a manually operable valve stem mounted for longitudinal movement inside of said valve cylinders, a large cylindrical valve mounted on said stem for movement into and out of said large cylinder to close or open said outlet, a small valve fitted to said small cylinder, that is spaced from said large valve, movable into and out of said small cylinder to control the same, said valves so spaced apart on said stem that said large valve must be entered into the large cylinder before the small valve leaves the small cylinder to open the inlet port and means for normally biasing said valve stem to closed position of said inlet port.

6. A manual control valve for compressed air, comprising a valve body, oppositely positioned air inlet and outlet ports in communication with the interior of said body, large and small coaxial seatless valve cylinders forming a part of said ports, the cross-sectional area of the valve cylinder adjacent the outlet port being greater than that of the cylinder adjacent the inlet port, an axially movable valve stem mounted coaxially of said cylinders, there being a large exhaust valve and a small inlet valve portion in spaced position on said stem and adapted to close said cylinders, said portions being so spaced with respect to said cylinders that said cylinders can be closed concurrently, or opened alternately, but not both opened, said valves being spring biased to normally close said inlet valve, and manual regulating means for moving said valve stem axially.

NORMAN C. WILLIAMS.
ROLLIN W. FISHWOOD.

References Cited in the file of this patent

UNITED STATES PATENTS

| Number | Name | Date |
|---|---|---|
| 314,836 | Harvey | Mar. 31, 1885 |
| 828,086 | Bowers | Aug. 7, 1906 |
| 942,065 | Grebel | Dec. 7, 1909 |
| 965,270 | Zelle | July 26, 1910 |
| 1,156,933 | Rowe | Oct. 19, 1915 |
| 1,721,290 | Badertscher | July 16, 1929 |

FOREIGN PATENTS

| Number | Country | Date |
|---|---|---|
| 15,994 | Great Britain | of 1934 |